United States Patent
Takaki

(10) Patent No.: US 12,459,400 B2
(45) Date of Patent: Nov. 4, 2025

(54) WORKING MACHINE

(71) Applicant: KUBOTA CORPORATION, Osaka (JP)

(72) Inventor: Go Takaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 393 days.

(21) Appl. No.: 17/831,936

(22) Filed: Jun. 3, 2022

(65) Prior Publication Data

US 2022/0289073 A1 Sep. 15, 2022

Related U.S. Application Data

(63) Continuation of application No. PCT/JP2020/028105, filed on Jul. 20, 2020.

(30) Foreign Application Priority Data

Dec. 23, 2019 (JP) ................................. 2019-232041

(51) Int. Cl.
*B60L 58/26* (2019.01)

(52) U.S. Cl.
CPC .......... *B60L 58/26* (2019.02); *B60L 2200/40* (2013.01); *B60L 2240/425* (2013.01); *B60L 2240/545* (2013.01)

(58) Field of Classification Search
CPC ................. B60L 58/26; B60L 2200/40; B60L 2240/425; B60L 2240/545; B60L 2210/10;
(Continued)

(56) References Cited

U.S. PATENT DOCUMENTS 5,834,132 A * 11/1998 Hasegawa ........... H01M 10/657
429/62
2011/0233996 A1 9/2011 Kato et al.
(Continued)

FOREIGN PATENT DOCUMENTS

CN 101700738 A 5/2010
CN 110406351 A * 11/2019 ......... B60H 1/00392
(Continued)

OTHER PUBLICATIONS

Shigeki Kinomura, Cooling device for vehicle, Jun. 11, 2009 (Year: 2009).*
(Continued)

*Primary Examiner* — James M Mcpherson
*Assistant Examiner* — Bakari Underwood
(74) *Attorney, Agent, or Firm* — Greenblum & Bernstein, P.L.C.

(57) ABSTRACT

A working machine includes a battery unit; an electrical component; a radiator; an electrical-component cooling water channel along which cooling water delivered from an outflow port of the radiator is supplied to the electrical component and, after cooling the electrical component, circulates to an inflow port of the radiator; a switching unit provided on the electrical-component cooling water channel; and a battery cooling water channel along which the cooling water is supplied from the switching unit to the battery unit and, after cooling the battery unit, flows to the electrical-component cooling water channel. The switching unit is switchable between a first state of blocking a flow of the cooling water from the electrical-component cooling water channel to the battery cooling water channel and a second state of causing the cooling water to flow from the electrical-component cooling water channel to the battery cooling water channel.

14 Claims, 6 Drawing Sheets

(58) Field of Classification Search
CPC .. B60L 2210/40; B60L 1/02; B60L 2240/525; F01P 3/12; F01P 7/16; H01M 10/48; H01M 10/613; H01M 10/6567
See application file for complete search history.

(56) References Cited

U.S. PATENT DOCUMENTS

| | | | |
|---|---|---|---|
| 2012/0102995 A1 | 5/2012 | Sakata | |
| 2017/0263914 A1* | 9/2017 | Ito | H01M 10/425 |
| 2018/0015839 A1 | 1/2018 | Ito et al. | |

FOREIGN PATENT DOCUMENTS

| | | | |
|---|---|---|---|
| CN | 110525271 A | | 12/2019 |
| JP | 2009126256 A | * | 6/2009 |
| JP | 2011-182607 A | | 9/2011 |
| JP | 2012-93047 A | | 5/2012 |
| JP | 2013-141875 A | | 7/2013 |
| JP | 2019-508311 A | | 3/2019 |
| WO | 2016/132641 A1 | | 8/2016 |

OTHER PUBLICATIONS

Lyu Guanxiao, Thermal management system for new energy vehicle. Nov. 5, 2019 NPL attached.*
European Search Report issued in the corresponding European Patent Application No. 20907426.9 dated Dec. 13, 2023.
International Search Report and Written Opinion of the international Searching Authority issued in International Patent Application No. PCT/JP/2020/028105, dated Oct. 6, 2021, along with an English translation thereof.
Notification of Reasons for Rejection issued to corresponding Japanese Patent Application No. 2019-232041 dated Sep. 6, 2022, along with English translation thereof.

* cited by examiner

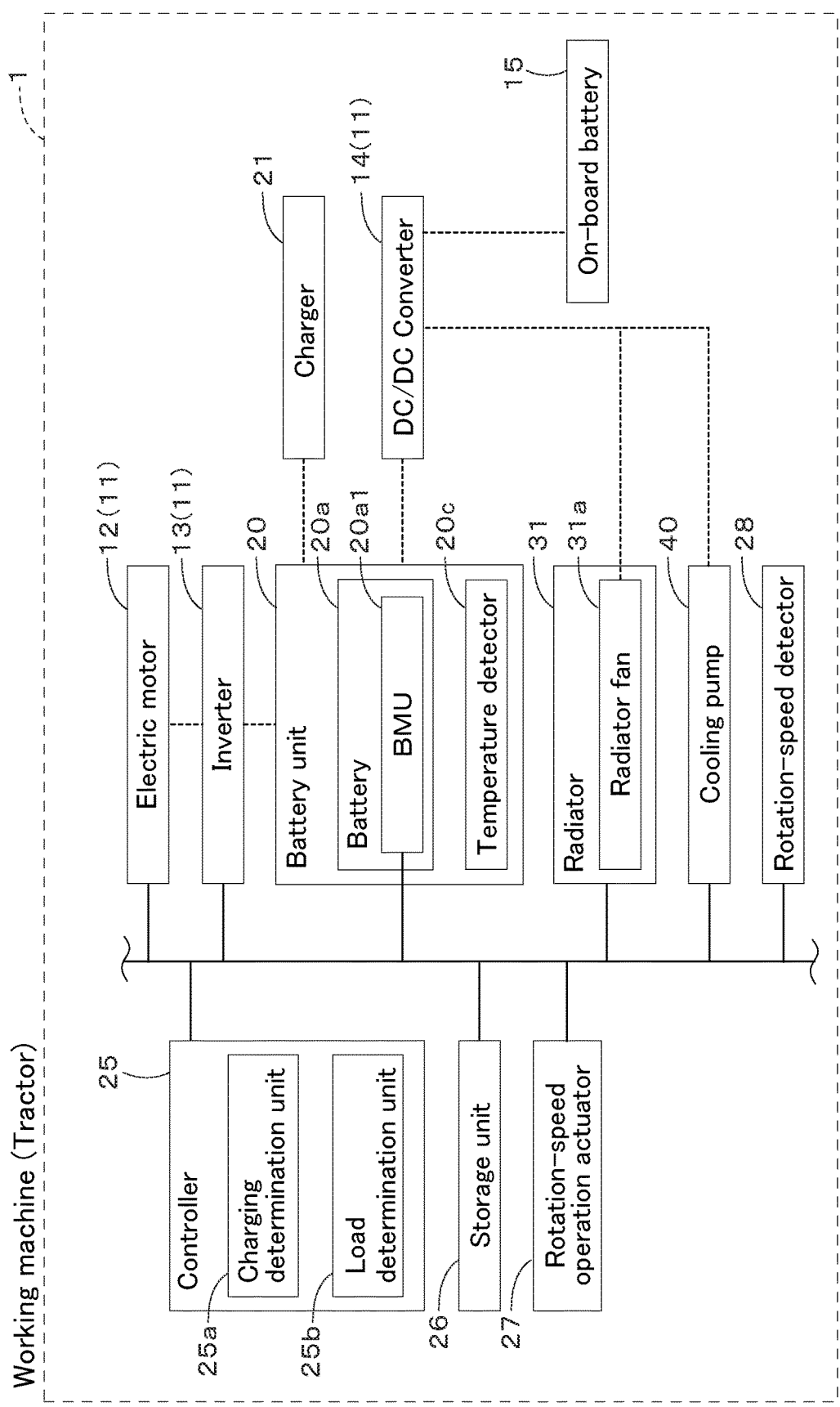

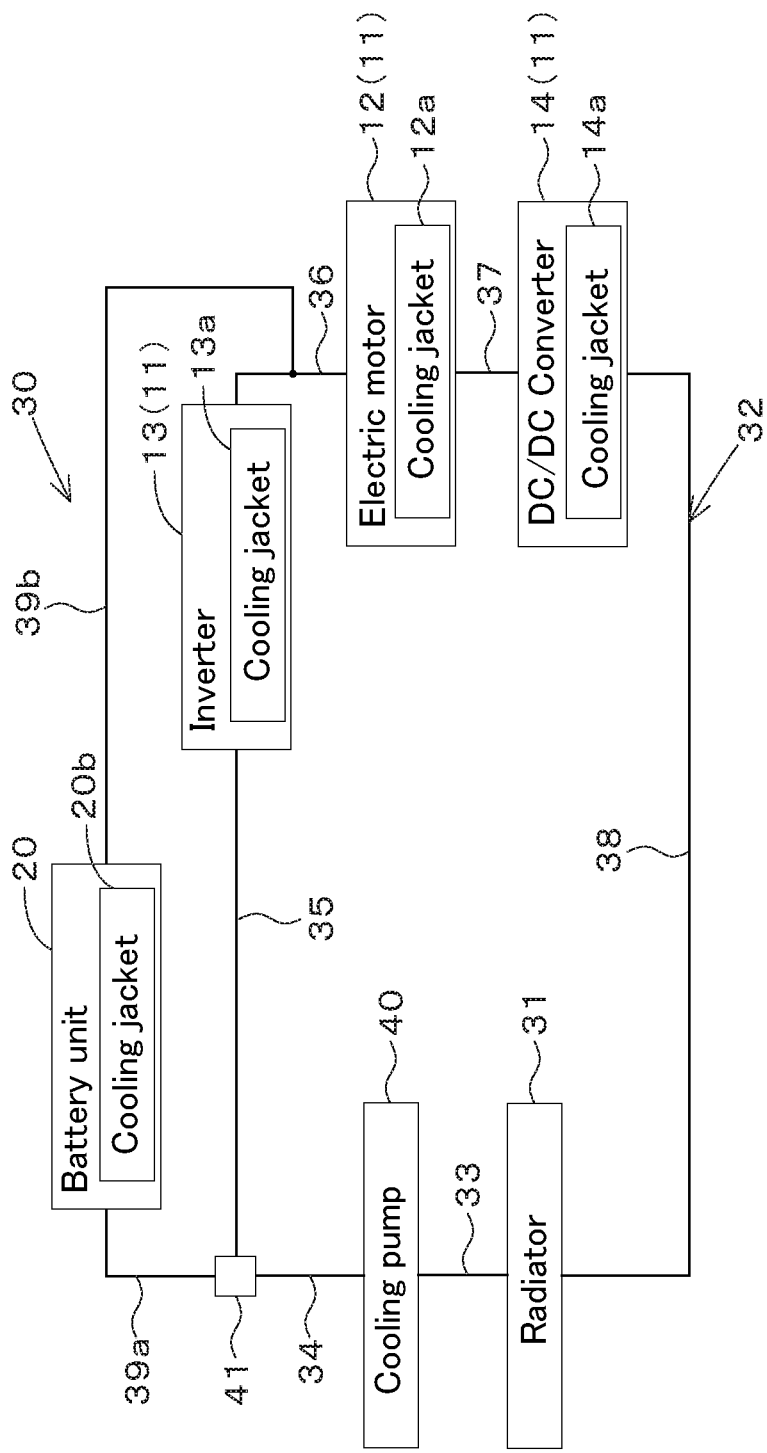

WORKING MACHINE

CROSS REFERENCE TO RELATED APPLICATIONS

This application is a continuation application of International Application No. PCT/JP2020/028105, filed on Jul. 20, 2020, which claims the benefit of priority to Japanese Patent Application No. 2019-232041, filed on Dec. 23, 2019. The entire contents of each of these applications are hereby incorporated herein by reference.

BACKGROUND OF THE INVENTION

1. Field of the Invention

The present invention relates to a working machine that includes a battery unit and an electric motor.

2. Description of the Related Art

In the related art, the working machine (electric tractor) disclosed in Japanese Unexamined Patent Application Publication No. 2013-141875 includes a battery unit (battery), a pump motor that is driven by electric power output by the battery unit, a hydraulic pump that delivers a hydraulic fluid by driving of the pump motor, and a hydraulic actuator that is driven by the hydraulic fluid delivered by the hydraulic pump.

SUMMARY OF THE INVENTION

A working machine of this type, however, has a problem that the temperatures of a battery unit (battery) and an electrical component rise, for example, when the battery unit is under being charged or when a load is generated in the electrical component, such as a pump motor, to which the battery unit supplies electric power. Thus, a cooling mechanism that cools the electrical component, such as a pump motor, and the battery unit may be considered to be provided. However, since the electrical component, such as a pump motor, and the battery unit have different upper limit temperatures, the capacity of the cooling mechanism is required to cope with that having a lower upper limit temperature to cool both of the electrical component and the battery unit. Therefore, a cooling mechanism in which the size of a device is relatively large and in which cooling capacity is high is required, which increases costs.

The present invention has been made to solve such problems in the related art, and an object of the present invention is to provide a working machine capable of cooling a battery unit and an electrical component at low costs.

A working machine according to one aspect includes a battery unit; an electrical component that is driven by electric power supplied from the battery unit; a radiator that cools cooling water; an electrical-component cooling water channel along which the cooling water delivered from an outflow port of the radiator is supplied to the electrical component and the cooling water after cooling the electrical component circulates to an inflow port of the radiator; a switching unit provided on the electrical-component cooling water channel; and a battery cooling water channel along which the cooling water is supplied from the switching unit to the battery unit and the cooling water after cooling the battery unit flows to the electrical-component cooling water channel. The switching unit is switchable between a first state of blocking a flow of the cooling water from the electrical-component cooling water channel to the battery cooling water channel and a second state of causing the cooling water to flow from the electrical-component cooling water channel to the battery cooling water channel.

The switching unit may be provided in a region from the outflow port of the radiator to the electrical component in the electrical-component cooling water channel.

The electrical-component cooling water channel may be provided with a plurality of the electrical components connected to each other in series along a path thereof for the cooling water. The switching unit may be provided in a region between one of the electrical components and another one of the electrical components in the electrical-component cooling water channel.

One end of the battery cooling water channel may be connected to the switching unit, and another end of the battery cooling water channel may be connected to a region from the switching unit to the electrical component in the electrical-component cooling water channel.

One end of the battery cooling water channel may be connected to the switching unit, and another end of the battery cooling water channel may be connected to a region from the electrical component to the inflow port of the radiator in the electrical-component cooling water channel.

The electrical-component cooling water channel may be provided with a plurality of the electrical components connected to each other in series along a path thereof for the cooling water. One end of the battery cooling water channel may be connected to the switching unit, and another end of the battery cooling water channel may be connected to a region between one of the electrical components and another one of the electrical components in the electrical-component cooling water channel.

The working machine may include a controller that controls operation of the switching unit. The switching unit may be an electromagnetic switching valve that switches between the first state and the second state in accordance with an instruction of the controller.

The controller may switch the switching unit to the first state when the battery unit is not under being charged, and may switch the switching unit to the second state when the battery unit is under being charged.

The electrical component may include an electric motor that is driven by electric power. The controller may switch the switching unit to the first state when a load of the electric motor is less than a predetermined value, and may switch the switching unit to the second state when the load of the electric motor is more than or equal to the predetermined value.

The working machine may include a temperature detector that detects a temperature of the battery unit. The controller may switch the switching unit to the first state when the temperature of the battery unit is less than a predetermined value, and may switch the switching unit to the second state when the temperature of the battery unit is more than or equal to the predetermined value.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 1 is a diagram illustrating the entirety of a system of a working machine.

FIG. 2C is a second diagram illustrating a modification of the cooling path of the working machine.

DETAILED DESCRIPTION OF THE PREFERRED EMBODIMENTS

Figure 2A:
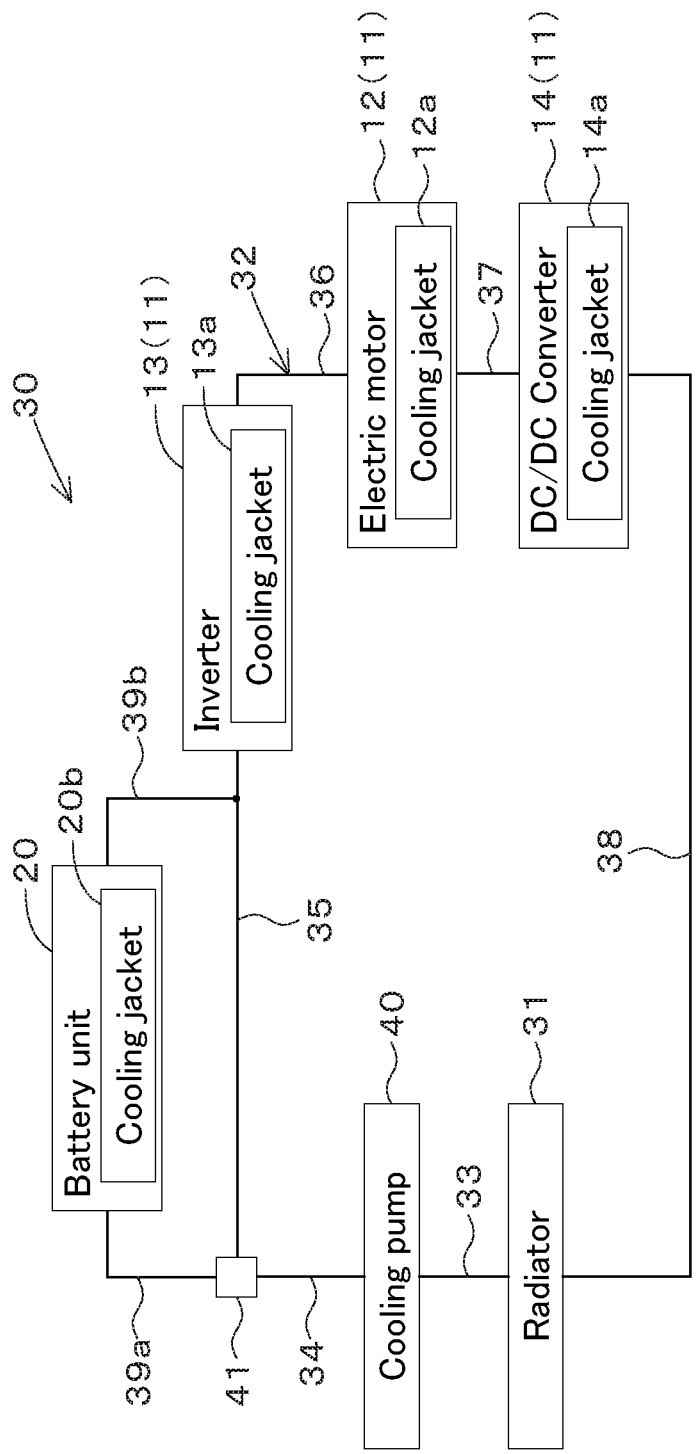
FIG. 2A is a diagram illustrating a cooling path of the working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, one embodiment of the present invention will be described with reference to the drawings.

Figure 4:
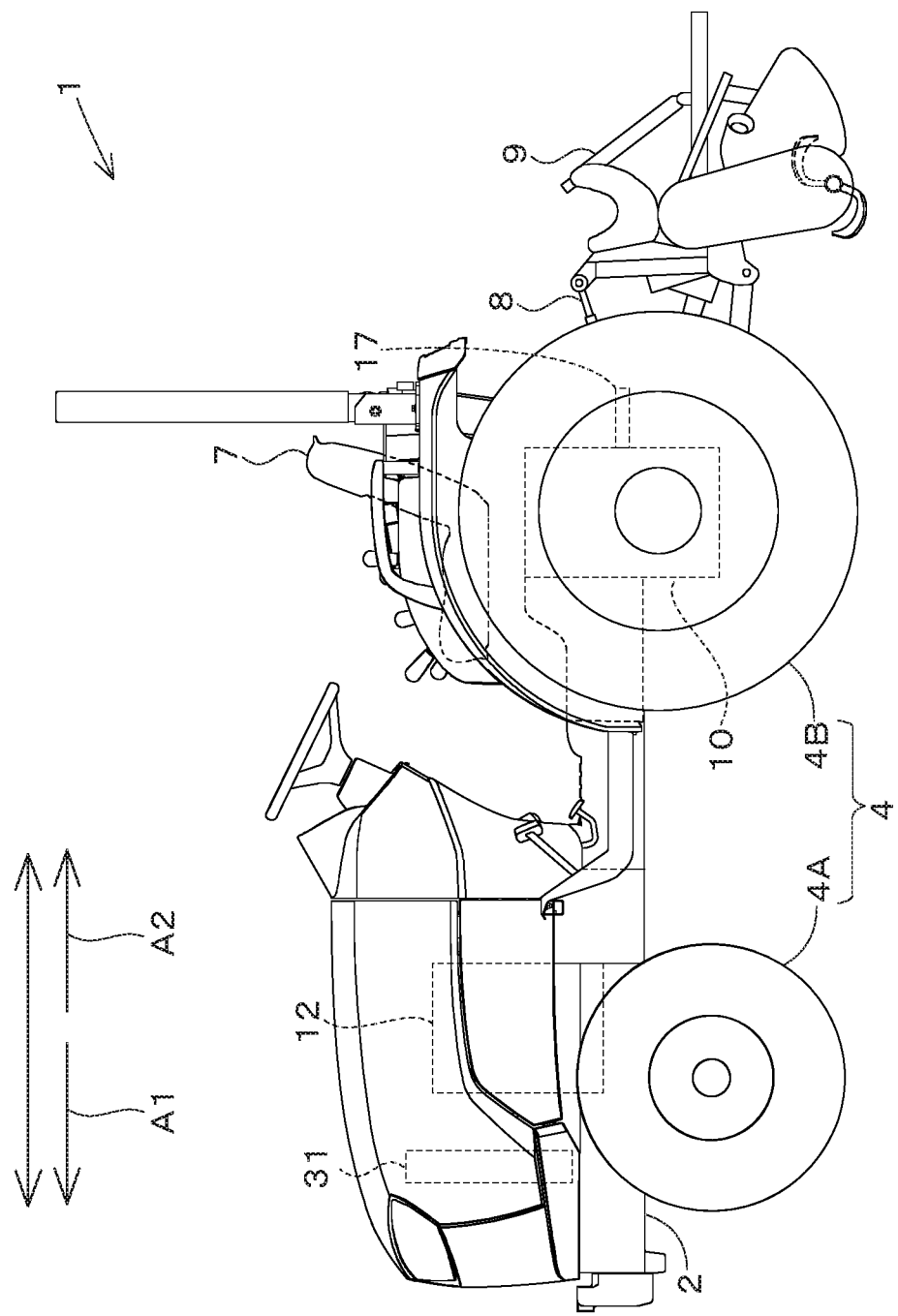
FIG. 4 is a side view of a tractor.

FIG. 4 is a side view illustrating one embodiment of a working machine 1. In the present embodiment, the working machine 1 is a tractor. The working machine 1 includes a vehicle body 2. The vehicle body 2 is provided with an operator's seat 7 on which an operator is to sit. Hereinafter, the front side (the arrow A1 direction in FIG. 4) of an operator sitting on the operator's seat 7 of the working machine 1 is described as the front side, the rear side (the arrow A2 direction in FIG. 4) of the operator is described as the rear side, the left side (the near side in FIG. 4) of the operator is described as the left side, and the right side (the far side in FIG. 4) of the operator is described as the right side. In addition, the horizontal direction that is a direction orthogonal to the front-rear direction of the working machine 1 is described as the width direction.

As illustrated in FIG. 1 and FIG. 4, the working machine 1 includes a traveling device 4, a battery unit 20, electrical components 11, a transmission 10, and a coupling portion 8. The traveling device 4, the battery unit 20, the electrical components 11, the transmission 10, and the coupling portion 8 are provided at the vehicle body 2. As illustrated in FIG. 4, the traveling device 4 is a device that has a front wheel 4A and a rear wheel 4B that are rotatably driven. The vehicle body 2 can be caused to travel by the traveling device 4. Note that each of the front wheel 4A and the rear wheel 4B may be of a tire type or a crawler type.

The battery unit 20 is a structure body that can store electric power and that outputs the stored electric power. The battery unit 20 has a battery 20a in the inside of a housing (case). The battery 20a can store electric power and is, for example, a secondary battery, such as a lithium ion battery, a lead storage battery, or the like. The battery 20a has a plurality of cells in the inside thereof, and the plurality of cells are electrically connected in series and in parallel to each other. The battery unit 20 is connected to a charger 21 provided at the working machine 1. The charger 21 is a socket to which a cable for charging the battery unit 20 is to be connected. The battery unit 20 can be charged by electric power supplied from the outside via the charger 21.

The electrical components 11 are driven by electric power supplied from the battery unit 20. In detail, the electrical components 11 include a device that is directly or indirectly connected to the battery unit 20 and that transmits electrical power supplied by the battery unit 20, a device that is operated by the electric power, and the like. As illustrated in FIG. 1, the electrical components 11 include an electric motor 12 that is driven by electric power of the battery unit 20. In addition, the electrical components 11 include, for example, an inverter 13 and a DC/DC converter 14.

The electric motor 12 is a driving source of the working machine 1 driven by electric power output by the battery unit 20. The electric motor 12 rotates a drive shaft by electric power supplied from the battery unit 20. The electric motor 12 is a three-phase AC synchronous motor of an interior permanent magnet type. The electric motor 12 has a rotatable rotor (rotor element) and a stator (stator element) that generates power for rotating the rotor.

The inverter 13 is connected to the battery unit 20 and the electric motor 12. The inverter 13 is a device that drives the electric motor 12, and converts direct-current power supplied by the battery unit 20 into three-phase alternating-current power and supplies the three-phase alternating-current power to the electric motor 12. That is, the electric motor 12 is connected to the battery unit 20 via the inverter 13. Note that the inverter 13 can optionally change the current and the voltage of electric power that is to be supplied to the electric motor 12.

The DC/DC converter 14 is connected to the battery unit 20 and converts the voltage of direct-current power supplied from the battery unit 20 into a different voltage. In the present embodiment, the DC/DC converter 14 is a step-down converter that converts an input voltage into a lower voltage. The DC/DC converter 14 supplies electric power to, for example, an on-board battery 15 that supplies a power source to an electronic device provided in the working machine 1.

The transmission 10 is connected to the drive shaft of the electric motor 12. Power that is output by the electric motor 12 is transmitted to the transmission 10, and the traveling device 4 is driven by the power speed-changed by the transmission 10. The transmission 10 is provided with an output shaft (PTO shaft) 17 that outputs, to the outside, the power that is output by the electric motor 12. The PTO shaft 17 is provided to project rearward from a rear portion of the vehicle body 2.

The coupling portion 8 is provided at the vehicle body 2 to be able to swing. A working device 9 is attachable to and detachable from a rear portion of the coupling portion 8.

The working device 9 is actuated by power that is input from the outside, for example, power that is input from the PTO shaft 17. The working device 9 is, for example, a cultivator for cultivation, a fertilizer spreader for spreading a fertilizer, an agricultural chemical spreader for spreading an agricultural chemical, a harvester for harvesting, a mower for mowing grass or the like, a tedder for tedding grass or the like, a rake for raking grass or the like, and a baler (roll baler) for baling grass or the like.

In the above-described embodiment, the drive shaft of the electric motor 12 and the transmission 10 are connected to each other, power that is output by the electric motor 12 is transmitted to the transmission 10, and the traveling device 4 is driven by the power that is speed-changed by the transmission 10; however, the configuration of the traveling device 4 is not limited thereto. For example, an electric motor for travelling may be provided separately from the electric motor 12 to configure such that the electric motor for travelling is driven by electric power supplied from the battery unit 20. Alternatively, a hydraulic motor for travelling may be provided to configure such that a hydraulic pump (not illustrated) is driven by the power of the electric motor 12 and the hydraulic motor for travelling is driven by a hydraulic fluid that is output from the hydraulic pump.

As illustrated in FIG. 1, the working machine 1 includes a controller 25 and a storage unit 26. The controller 25 is a device that includes an electric/electronic circuit, a program stored in a CPU or the like, and the like and controls various devices included in the working machine 1. For example, the controller 25 controls the rotation speed of the electric motor 12 on the basis of an operation of a rotation-speed operation actuator (accelerator pedal) 27, which is an operable operation device provided around the operator's seat 7. The storage unit 26 is a nonvolatile memory or the like and stores various types of information and the like relating to control by the controller 25. For example, the storage unit 26 stores information, such as a table or the like, relating to the rotation speed of the electric motor 12 with respect to the operation amount of the rotation-speed operation actuator 27.

The working machine 1 includes a cooling system 30 that cools the electrical components 11. As illustrated in FIG. 2A, the cooling system 30 has a radiator 31 that cools a refrigerant (cooling water), and a cooling path 32 along which the cooling water circulates. The cooling water is caused to circulate to the electrical components 11, thereby cooling the electrical components 11.

As illustrated in FIG. 4, the radiator 31 is provided, for example, at a front portion of the vehicle body 2. The radiator 31 cools (removes heat from) the cooling water that passes through the inside, by cooling air generated by a radiator fan 31a. The radiator fan 31a is a suction-type fan that is driven by electric power stepped down by the DC/DC converter 14. The radiator fan 31a sucks air from the front of the vehicle body 2 and causes the air to flow to the radiator 31.

As illustrated in FIG. 2A, the cooling path 32 includes a first water channel (electrical-component cooling water channel) 33 that connects an outflow port of the radiator 31 and an inflow port of a cooling pump 40 to each other; a second water channel (electrical-component cooling water channel) 34 that connects an outflow port of the cooling pump 40 and an inflow port of a switching unit 41 to each other; a third water channel (electrical-component cooling water channel) 35 that connects a first outflow port of the switching unit 41 and an inflow port of the inverter 13 to each other; a fourth water channel (electrical-component cooling water channel) 36 that connects an outflow port of the inverter 13 and an inflow port of the electric motor 12 to each other; a fifth water channel (electrical-component cooling water channel) 37 that connects an outflow port of the electric motor 12 and an inflow port of the DC/DC converter 14 to each other; a sixth water channel (electrical-component cooling water channel) 38 that connects an outflow port of the DC/DC converter 14 and an inflow port of the radiator 31 to each other; a seventh water channel (battery cooling water channel) 39a that connects a second outflow port of the switching unit 41 and an inflow port of the battery unit 20 to each other; and an eighth water channel (battery cooling water channel) 39b that connects an outflow port of the battery unit 20 and the third water channel 35 to each other.

That is, the electrical-component cooling water channels 33 to 38 are water channels along which the cooling water delivered from the outflow port of the radiator 31 is supplied to the electrical components 11 and the cooling water after cooling the electrical components 11 circulates to the inflow port of the radiator 31. The battery cooling water channels 39a and 39b are water channels along which the cooling water is supplied from the switching unit 41 to the battery unit 20 and the cooling water after cooling the battery unit 20 flows to the electrical-component cooling water channels 33 to 38. The electrical-component cooling water channels 33 to 38 are provided with a plurality of the electrical components 11 (the electric motor 12, the inverter 13, and the DC/DC converter 14) connected to each other in series along the path thereof for the cooling water.

As illustrated in FIG. 2A, one end (end of the seventh water channel 39a) of the battery cooling water channels 39a and 39b is connected to the switching unit 41, and the other end (end of the eighth water channel 39b) thereof is connected to a region from the switching unit 41 to the electrical components 11 in the electrical-component cooling water channels 33 to 38.

The eighth water channel 39b may be provided with a check valve to cause the cooling water not to flow from the third water channel 35 toward the battery unit 20 while allowing a flow of the cooling water from the battery unit 20 to the third water channel 35.

The battery unit 20, the electric motor 12, the inverter 13, and the DC/DC converter 14 have cooling jackets 20b, 12a, 13a, and 14a, respectively, that are housed in the insides of respective housings (cases). The cooling water cools (removes heat from) the battery unit 20, the electric motor 12, the inverter 13, and the DC/DC converter 14 by passing through the insides of the cooling jackets 20b, 12a, 13a, and 14a from the inflow ports (ports from which the cooling water flows in) of the cooling jackets 12a, 13a, 14a, and 20b and exchanging heat in the insides, and flows out to the outside of the cooling jackets 20b, 12a, 13a, and 14a from the outflow ports (ports from which the cooling water flows out).

The switching unit 41 is provided on the electrical-component cooling water channels 33 to 38 and is switchable between a first state of blocking the flow of the cooling water from the electrical-component cooling water channels 33 to 38 to the battery cooling water channels 39a and 39b and a second state of causing the cooling water to flow from the electrical-component cooling water channels 33 to 38 to the battery cooling water channels 39a and 39b. Specifically, the switching unit 41 is a two-position switching valve that is provided in a region from the outflow port of the radiator 31 to the electrical components 11 in the electrical-component cooling water channels 33 to 38 and that is switchable between a first position (first state) that causes the cooling water that has flowed in from the inflow port to flow to the third water channel 35 from the first outflow port and a second position (second state) that causes the cooling water that has flowed in from the inflow port to flow out to the seventh water channel 39a from the second outflow port. The switching unit 41 is an electromagnetic switching valve that is switchable between the first position and the second position on the basis of a control signal that is output by the controller 25. In the present embodiment, the switching unit 41 is switched to the first position by a spring and switched to the second position by energization of a solenoid. Consequently, the cooling path 32 in the present embodiment is switchable to a path that does not cause the cooling water to flow to the battery unit 20 and causes the cooling water to flow to the electrical components 11 (the inverter 13, the electric motor 12, and the DC/DC converter 14), and a path that causes the cooling water to flow to both of the battery unit 20 and the electrical components 11.

The controller 25 can control operation of the switching unit 41 and switches the switching unit 41 between the first state (first position) and the second state (second position) by outputting a control signal to the switching unit 41 on a predetermined condition. In other words, the switching unit 41 switches between the first state and the second state in accordance with an instruction of the controller 25. In the present embodiment, when the battery unit 20 is not under being charged and when the load of the electric motor 12 is less than a predetermined value, the controller 25 switches the switching unit 41 to the first position not to cause the cooling water to flow to the battery unit 20 and to cause the cooling water to flow to the electrical components 11. When the battery unit 20 is under being charged and when the load of the electric motor 12 is more than or equal to the predetermined value, the controller 25 switches the switching unit 41 to the second position to cause the cooling water to flow to both of the battery unit 20 and the electrical components 11.

Charging of the battery 20a will be described. The battery 20a has a BMU (battery management unit) 20a1. The BMU 20a1 can acquire, for example, the voltage, the temperature, and the current of the battery 20a, the terminal voltage of a cell in the inside thereof, and the like and performs charging control of the battery 20a.

The BMU 20a1 outputs a charging stop signal to the charger 21 when the voltage of the battery 20a reaches a predetermined limit value and outputs a charging permission signal to the charger 21 when the voltage of the battery 20a is less than the limit value. When obtained the charging stop signal from the BMU 20a1, the charger 21 blocks charging current to the battery 20a by performing a relay opening-closing operation. When obtained the charging permission signal from the BMU 20a1, the charger 21 allows charging current to the battery 20a by performing a relay opening-closing operation.

In a state of outputting the charging permission signal, when a cable is connected to the charger 21 and electric power is supplied to the charger 21 from the outside, the BMU 20a1 charges the battery 20a, for example, with small current for a short time. The BMU 20a1 determines whether the voltage of the battery 20a rises by a predetermined amount or more (pre-charge). When the voltage of the battery 20a rises by the predetermined amount or more by pre-charge, the BMU 20a1 outputs a charging start signal to the charger 21. The charger 21 charges the battery 20a by a means, such as CVCC charging or the like. On the basis of conditions, such as a charging time, a power supply amount, and the like, the BMU 20a1 determines whether to cause charging of the battery 20a to be ended. When a predetermined charging time has elapsed or when the power supply amount is more than or equal to a predetermined amount, the BMU 20a1 outputs the charging stop signal to the charger 21 to cause the charger 21 to block the charging current and end charging of the battery 20a.

When the voltage of the battery 20a does not rise by the predetermined amount or more in pre-charge, the BMU 20a1 outputs the charging stop signal to the charger 21 to cause the charger 21 to block charging current and end charging of the battery 20a.

As illustrated in FIG. 1, the controller 25 has a charging determination unit 25a and a load determination unit 25b. The controller 25 outputs a control signal to the switching unit 41 on the basis of determination by the charging determination unit 25a and the load determination unit 25b and controls the switching unit 41. The charging determination unit 25a and the load determination unit 25b are constituted by an electric/electronic circuit provided in the controller 25, a program stored in a CPU, the storage unit 26, or the like, and the like. The charging determination unit 25a acquires information relating to the battery 20a from the outside of the controller 25 and determines whether the battery 20a is under being charged. In the present embodiment, the charging determination unit 25a determines whether the battery 20a is under being charged by acquiring a signal (the charging stop signal and the charging start signal) from the BMU 20a1. The determination method is not limited to the aforementioned method as long as the charging determination unit 25a can determine whether the battery 20a is under being charged.

The load determination unit 25b acquires information relating to the electric motor 12, the battery 20a, and the like from the outside of the controller 25 and determines a load of the electric motor 12. The load determination unit 25b determines a load of the electric motor 12 on the basis of, for example, the rotation speed of the electric motor 12 and electric power (supply electric power) that is supplied to the electric motor 12 by the inverter 13. Specifically, the load determination unit 25b acquires a signal from a rotation-speed detector 28 that detects an actual rotation speed of the drive shaft of the electric motor 12, and acquires the rotation speed of the electric motor 12 on the basis of the signal. In addition, the load determination unit 25b acquires information relating to the supply electric power from the inverter 13 and determines a load of the electric motor 12 on the basis of a table previously stored in the storage unit 26 and an actual rotation speed of the electric motor 12. The table is formed on the basis of a relationship between the supply electric power and the actual rotation speed and is previously set such that the supply electric power and the actual rotation speed are in association with each other on the basis of the load of the electric motor 12. For example, when acquired an actual rotation speed of the electric motor 12, the load determination unit 25b acquires a threshold value of the supply electric power corresponding to the actual rotation speed. The load determination unit 25b compares the supply electric power of the inverter 13 and the threshold value and, when the supply electric power of the inverter 13 is less than the threshold value, determines that the load of the electric motor 12 is less than a predetermined value (proper). Meanwhile, the load determination unit 25b compares the supply electric power of the inverter 13 and the threshold value and, when the supply electric power of the inverter 13 is more than or equal to the threshold value, determines that the load of the electric motor 12 is more than or equal to the predetermined value (relatively large).

In the present embodiment, the load determination unit 25b acquires a threshold value of the supply electric power corresponding to an actual rotation speed of the electric motor 12 and compares the supply electric power of the inverter 13 and the threshold value. The means for detecting the load of the electric motor 12 is, however, not limited to the aforementioned means. The load determination unit 25b may acquire a threshold value of the rotation speed of the electric motor 12 corresponding to the supply electric power of the inverter 13 and compare the actual rotation speed of the electric motor 12 and the threshold value.

Figure 3:
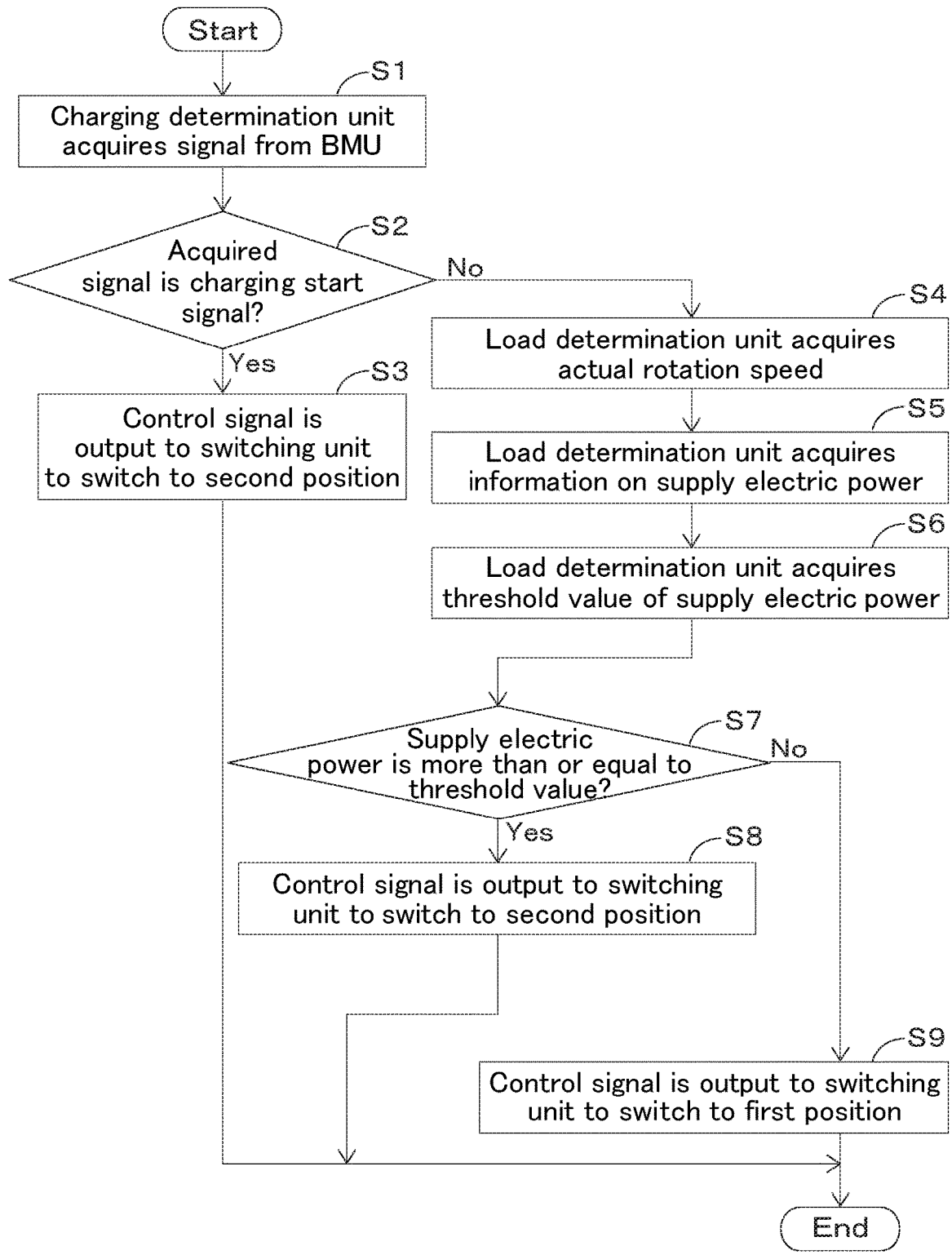
FIG. 3 is a diagram illustrating a series of a flow of control of a switching unit by a controller.

Hereinafter, a series of the flow of control of the switching unit 41 by the controller 25 will be described. As illustrated in FIG. 3, the charging determination unit 25a first acquires a signal relating to charging of the battery 20a from the BMU 20a1 (S1). The charging determination unit 25a confirms whether the signal acquired from the BMU 20*a*1 is the charging start signal (S2).

As illustrated in FIG. 3, when acquired the charging start signal from the BMU 20*a*1 (S2, Yes), the charging determination unit 25*a* determines that the battery 20*a* is under being charged. The controller 25 outputs a control signal to the switching unit 41 and switches the switching unit 41 to the second position (S3).

Meanwhile, when a signal (the charging stop signal or the charging permission signal) other than the charging start signal is received by the charging determination unit 25*a* from the BMU 20*a*1 (S2, No), the load determination unit 25*b* acquires a signal from the rotation-speed detector 28 and acquires an actual rotation speed of the electric motor 12 (S4).

As illustrated in FIG. 3, when acquired an actual rotation speed of the electric motor 12 (S4), the load determination unit 25*b* acquires information relating to the supply electric power from the inverter 13 (S5). The load determination unit 25*b* acquires a threshold value of the supply electric power in association with the actual rotation speed of the electric motor 12 on the basis of the table stored in the storage unit 26 (S6).

As illustrated in FIG. 3, when acquired a threshold value of the supply electric power from the storage unit 26, the load determination unit 25*b* determines whether the supply electric power of the inverter 13 is more than or equal to the threshold value of the supply electric power in association with the actual rotation speed of the electric motor 12 (S7). The load determination unit 25*b* compares the supply electric power of the inverter 13 and the threshold value and, when the supply electric power of the inverter 13 is more than or equal to the threshold value (S7, Yes), determines that the load of the electric motor 12 is relatively large. The controller 25 outputs a control signal to the switching unit 41 and switches the switching unit 41 to the second position (S8).

In addition, as illustrated in FIG. 3, the load determination unit 25*b* compares the supply electric power of the inverter 13 and the threshold value and, when the supply electric power of the inverter 13 is less than the threshold value (S7, No), determines that the load of the electric motor 12 is less than a predetermined value. The controller 25 outputs a control signal to the switching unit 41 and switches the switching unit 41 to the first position (S9). In other words, when the battery 20*a* is not under being charged and when the load of the electric motor 12 is less than the predetermined value, the controller 25 outputs a control signal to the switching unit 41 and switches the switching unit 41 to the first position. Consequently, the switching unit 41 is switched to the first position when the battery 20*a* is not under being charged and when the load of the electric motor 12 is less than the predetermined value.

In the above-described embodiment, the controller 25 switches the switching unit 41 to the second position when the battery 20*a* is under being charged and when the load of the electric motor 12 is more than or equal to the predetermined value, and switches the switching unit 41 to the first position when the battery 20*a* is not under being charged and when the load of the electric motor 12 is less than the predetermined value. The conditions for switching of the switching unit 41 are, however, not limited to the conditions described above. The switching conditions may be optionally deleted, added, and changed. Specifically, for example, the controller 25 may be configured to switch the switching unit 41 to the first position when the battery 20*a* is not under being charged and switch the switching unit 41 to the second position when the battery 20*a* is under being charged. In addition, the controller 25 may be configured to switch the switching unit 41 to the first position when the load of the electric motor 12 is less than a predetermined value and switch the switching unit 41 to the second position when the load of the electric motor 12 is more than or equal to the predetermined value.

In addition, a temperature detector 20*c* that detects the temperature of the battery unit 20 may be provided to configure such that the switching unit 41 is switched to the second position when the temperature of the battery unit 20 is more than or equal to a predetermined temperature (predetermined value), and the switching unit 41 is switched to the first position when the temperature of the battery unit 20 is less than the predetermined temperature.

In the above-described embodiment, the path along which the cooling water circulates is switchable to the path that does not cause the cooling water to flow to the battery 20*a* and that causes the cooling water to flow to the electrical components 11 and the path that causes the cooling water to flow to both of the battery 20*a* and the electrical components 11. The path along which the cooling water circulates is, however, not limited to the aforementioned path as long as at least switchable to a path that does not cause the cooling water to flow to the battery 20*a* and that causes the cooling water to flow to the electrical components 11 and a path that causes the cooling water to flow to the battery 20*a*.

Figure 2B:
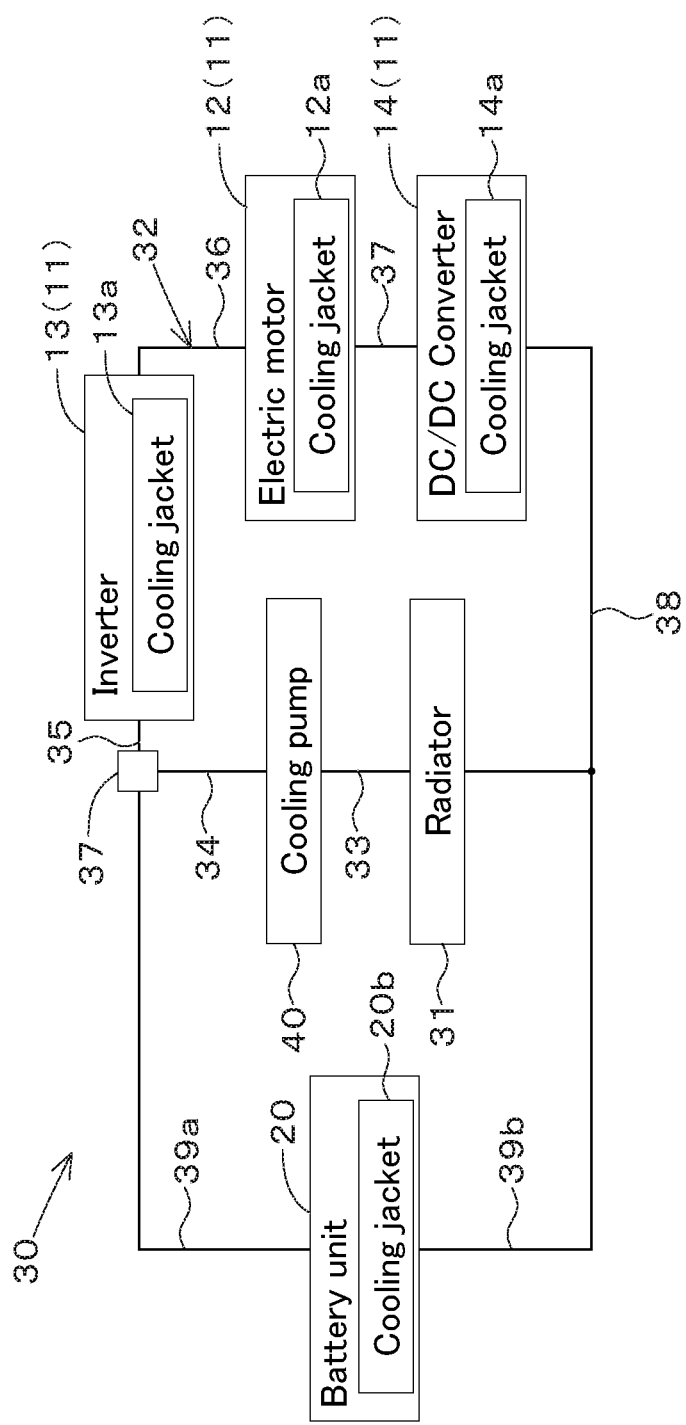
FIG. 2B is a first diagram illustrating a modification of the cooling path of the working machine.

For example, one end (end of the seventh water channel 39*a*) of the battery cooling water channels 39*a* and 39*b* may be connected to the switching unit 41, and the other end (end of the eighth water channel 39*b*) of the battery cooling water channels 39*a* and 39*b* may be connected to a region from the electrical components 11 to the inflow port of the radiator 31 in the electrical-component cooling water channels 33 to 38. As illustrated in FIG. 2B, one end of the eighth water channel 39*b* may be connected to the outflow port of the battery unit 20, and the other end may be connected to the sixth water channel 38. In this case, when the switching unit 41 is switched to the first position, the cooling water flows to each of the electrical components 11 (the inverter 13, the electric motor 12, and the DC/DC converter 14), and, when the switching unit 41 is switched to the second position, the cooling water does not flow to each of the electrical components 11 and flows to the battery unit 20.

In addition, one end (end of the seventh water channel 39*a*) of the battery cooling water channels 39*a* and 39*b* may be connected to the switching unit 41, and the other end (end of the eighth water channel 39*b*) thereof may be connected to a region between one of the electrical components 11 and another one of the electrical components 11 in the electrical-component cooling water channels 33 to 38. As illustrated in FIG. 2C, one end of the eighth water channel 39*b* may be connected to the fourth water channel 36 or may be connected to the fifth water channel 37.

In the present embodiment, the inverter 13, the electric motor 12, and the DC/DC converter 14 are arranged in this order in the flowing direction of the cooling water. The arrangement thereof is not limited thereto, and arrangement orders may be replaced.

In the present embodiment, an example in which the battery unit 20 includes only one battery 20*a* has been described. The battery unit 20 is, however, not limited thereto and may have a configuration that includes a plurality of batteries 20*a* and that switches and uses the batteries 20*a*. In this case, each of the batteries 20*a* may be provided with a cooling jacket corresponding thereto.

It may be configured such that whether to supply the cooling water is switchable for each of the cooling jackets corresponding to respective batteries 20*a* to selectively cool each battery 20*a* for which cooling is required. Specifically, for example, only each battery 20*a* that is under being charged, each battery 20*a* that is under supplying power to the electrical components 11, or each battery 20*a* whose temperature is more than or equal to a predetermined temperature may be cooled.

In the present embodiment, an example in which the working machine 1 is a tractor has been described. The working machine 1 is, however, not limited to a tractor as long as being a working machine that is driven by electric power stored in the battery 20*a*. For example, the working machine 1 may be agricultural machinery, such as a combine, a rice transplanter, a lawn mower, or the like, may be construction machinery, such as a backhoe, a wheel loader, a compact track loader, a skid-steer loader, or the like, and may be industrial machinery, such as a forklift or the like.

In the present embodiment, a configuration that includes the switching unit 41 formed by a two-position switching valve has been described. The switching unit 41 is, however, not limited thereto and may be a flow-rate regulating valve capable of continuously regulating a ratio between the amount of water that flows out to the third water channel 35 from the first outflow port and the amount of water that flows out to the seventh water channel 39*a* from the second outflow port. In this case, for example, the amount of water that flows to the seventh water channel 39*a* from the second outflow port may be regulated in accordance with the temperature of the battery unit 20.

The working machine 1 described above includes the battery unit 20; the electrical components 11 that are driven by electric power supplied from the battery unit 20; the radiator 31 that cools the cooling water; the electrical-component cooling water channels 33 to 38 along which the cooling water delivered from the outflow port of the radiator 31 is supplied to the electrical components 11 and the cooling water after cooling the electrical components 11 circulates to the inflow port of the radiator 31; the switching unit 41 provided on the electrical-component cooling water channels 33 to 38; and the battery cooling water channels 39*a* and 39*b* along which the cooling water is supplied to the battery unit 20 from the switching unit 41 and the cooling water after cooling the battery unit 20 flows to the electrical-component cooling water channels 33 to 38. The switching unit 41 is switchable between the first state of blocking the flow of the cooling water from the electrical-component cooling water channels 33 to 38 to the battery cooling water channels 39*a* and 39*b* and the second state of causing the cooling water to flow from the electrical-component cooling water channels 33 to 38 to the battery cooling water channels 39*a* and 39*b*. According to the aforementioned configuration, by switching the switching unit 41, it is possible to switch between the first state of cooling the electrical components 11 and not cooling the battery unit 20 and the second state of cooling the battery unit 20 via the battery cooling water channels 39*a* and 39*b*.

The switching unit 41 is provided in a region from the outflow port of the radiator 31 to the electrical components 11 in the electrical-component cooling water channels 33 to 38. According to the aforementioned configuration, when the switching unit 41 is in the second state, it is possible to cool the battery unit 20 with the cooling water that flows out from the outflow port of the radiator 31, that is, of the circulating cooling water, cooling water having a relatively low temperature. It is thus possible to cool the battery unit 20 immediately.

The electrical-component cooling water channels 33 to 38 are provided with a plurality of the electrical components 11 connected to each other in series along the path thereof for the cooling water. The switching unit 41 is provided in a region between one of the electrical components 11 and another one of the electrical components 11 in the electrical-component cooling water channels 33 to 38. According to the aforementioned configuration, it is possible, even when the switching unit 41 is in any of the first state and the second state, to cool the plurality of electrical components 11 by causing the cooling water to circulate to the electrical components 11.

One end of the battery cooling water channels 39*a* and 39*b* is connected to the switching unit 41, and the other end of thereof is connected to the region from the switching unit 41 to the electrical components 11 in the electrical-component cooling water channels 33 to 38. According to the aforementioned configuration, by switching the switching unit 41, it is possible to cause the cooling water to circulate from the switching unit 41 to the plurality of electrical components 11 and perform cooling in the first state and to circulate from the switching unit 41 through the battery cooling water channels 39*a* and 39*b* and cool the battery unit 20 in the second state while cooling the plurality of electrical components 11 with the cooling water that has cooled the battery unit 20. It is thus possible to cool both of the battery unit 20 and the plurality of electrical components 11.

One end of the battery cooling water channels 39*a* and 39*b* is connected to the switching unit 41, and the other end thereof is connected to the region from the electrical components 11 to the inflow port of the radiator 31 in the electrical-component cooling water channels 33 to 38. According to the aforementioned configuration, by switching the switching unit 41, it is possible to cause the cooling water to circulate from the switching unit 41 to the plurality of electrical components 11 and perform cooling in the first state and to circulate from the switching unit 41 through the battery cooling water channels 39*a* and 39*b* and cool the battery unit 20 in the second state.

The electrical-component cooling water channels 33 to 38 are provided with the plurality of electrical components 11 connected to each other in series along the path thereof for the cooling water. One end of the battery cooling water channels 39*a* and 39*b* is connected to the switching unit 41, and the other end thereof is connected to the region between one of the electrical components 11 and another one of the electrical components 11 in the electrical-component cooling water channels 33 to 38. According to the aforementioned configuration, by switching the switching unit 41, it is possible to cause the cooling water to circulate from the switching unit 41 to the plurality of electrical components 11 and perform cooling in the first state and to circulate from the switching unit 41 through the battery cooling water channels 39*a* and 39*b* and cool the battery unit 20 in the second state while cooling the one of the electrical components 11 or the other one of the electrical components 11 with the cooling water that has cooled the battery unit 20. It is thus possible to cool both of the battery unit 20 and the electrical components 11. Therefore, it is possible to preferentially cool the battery unit 20 and some of the electrical components 11 of the plurality of electrical components 11.

The working machine 1 includes the controller 25 that controls operation of the switching unit 41. The switching unit 41 is an electromagnetic switching valve that switches between the first state and the second state in accordance with an instruction of the controller 25. According to the aforementioned configuration, it is possible to optionally switch the path of the cooling water by control by the controller 25.

The controller 25 switches the switching unit 41 to the first state when the battery unit 20 is not under being charged and switches the switching unit 41 to the second state when the battery unit 20 is under being charged. According to the aforementioned configuration, the cooling water flows in the electrical-component cooling water channels 33 to 38 and cools the plurality of electrical components 11 when the battery unit 20 is not under being charged, and the cooling water flows in the battery cooling water channels 39a and 39b and cools the battery unit 20 when the battery unit 20 is under being charged. Therefore, although the amount of heat generation of the battery unit 20 is large compared with the amount of heat generation of the electrical components 11 during charging of the battery unit 20, the battery unit 20 can be relatively immediately cooled.

The electrical components 11 include the electric motor 12. The controller 25 switches the switching unit 41 to the first state when the load of the electric motor 12 is less than a predetermined value and switches the switching unit 41 to the second state when the load of the electric motor 12 is more than or equal to the predetermined value. According to the aforementioned configuration, the cooling water flows in the electrical-component cooling water channels 33 to 38 and cools the electric motor 12 when a load to the electric motor 12 is less than a predetermined value and when the amount of heat generation of the battery unit 20 is relatively small, and the cooling water flows in the electrical-component cooling water channels 33 to 38 and cools the battery unit 20 when the load to the electric motor 12 is more than or equal to the predetermined value and when the amount of heat generation of the battery unit 20 is relatively large. Therefore, it is possible to preferentially cool the battery unit 20, as appropriate, in accordance with the load to the electric motor 12.

The working machine 1 includes the temperature detector 20c that detects the temperature of the battery unit 20. The controller 25 switches the switching unit 41 to the first state when the temperature of the battery unit 20 is less than a predetermined value and switches the switching unit 41 to the second state when the temperature of the battery unit 20 is more than or equal to the predetermined value. According to the aforementioned configuration, the cooling water flows in the electrical-component cooling water channels 33 to 38 and cools the electrical components 11 when the temperature of the battery unit 20 is less than the predetermined value and when the amount of heat generation of the battery unit 20 is relatively small, and the cooling water flows in the electrical-component cooling water channels 33 to 38 and cools the battery unit 20 when the temperature of the battery unit 20 is more than or equal to the predetermined value and when the amount of heat generation of the battery unit 20 is relatively large. Therefore, it is possible to preferentially cool the battery unit 20, as appropriate, in accordance with the temperature of the battery unit 20.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a battery unit;
an electrical component that is driven by electric power supplied from the battery unit;
a radiator that cools cooling water;
an electrical-component cooling water channel along which the cooling water delivered from an outflow port of the radiator is supplied to the electrical component and the cooling water after cooling the electrical component circulates to an inflow port of the radiator;
a switching unit provided on the electrical-component cooling water channel;
a battery cooling water channel along which the cooling water is supplied from the switching unit to the battery unit and the cooling water after cooling the battery unit flows to the electrical-component cooling water channel; and
a controller that controls operation of the switching unit,
wherein the electrical component includes an electric motor that is driven by electric power, and
wherein the controller
determines a load on the electric motor,
switches the switching unit to a first state when the controller determines that the load on the electric motor is less than a predetermined value, the first state being a state of blocking a flow of the cooling water from the electrical-component cooling water channel to the battery cooling water channel, and
switches the switching unit to a second state when the controller determines that the load on the electric motor is more than or equal to the predetermined value, the second state being a state of causing the cooling water to flow from the electrical-component cooling water channel to the battery cooling water channel.

2. The working machine according to claim 1, wherein the controller
acquires supply electric power that is supplied to the electric motor, and a threshold value of the supply electric power corresponding to an actual rotation speed of the electric motor,
determines that the load on the electric motor is less than the predetermined value when the supply electric power supplied to the electric motor is less than the threshold value, and
determines that the load on the electric motor is more than or equal to the predetermined value when the supply electric power supplied to the electric motor is more than or equal to the threshold value.

3. A working machine comprising:
a battery unit;
an electrical component that is driven by electric power supplied from the battery unit;
a radiator that cools cooling water;
an electrical-component cooling water channel along which the cooling water delivered from an outflow port of the radiator is supplied to the electrical component and the cooling water after cooling the electrical component circulates to an inflow port of the radiator;
a switching unit provided on the electrical-component cooling water channel;
a battery cooling water channel along which the cooling water is supplied from the switching unit to the battery unit and the cooling water after cooling the battery unit flows to the electrical-component cooling water channel; and a controller that controls operation of the switching unit,
wherein the switching unit is switchable, in accordance with an instruction of the controller, between a first state of blocking a flow of the cooling water from the electrical-component cooling water channel to the battery cooling water channel and a second state of causing the cooling water to flow from the electrical-component cooling water channel to the battery cooling water channel, and wherein the controller
determines whether or not the battery unit is under being charged,
switches the switching unit to the first state when the controller determines that the battery unit is not under being charged, and
switches the switching unit to the second state when the controller determines that pre-charge of the battery unit is performed and then the battery unit is charged.

4. The working machine according to claim 3, further comprising:
a battery controller to perform charging control of the battery unit; and
a charger to which a cable for charging the battery unit with electric power supplied from an outside is to be connected,
wherein the battery controller
performs the pre-charge if the cable is connected to the charger when a voltage of the battery unit is less than a predetermined limit value,
when the voltage of the battery unit rises by a predetermined amount or more in the pre-charge, outputs a charging start signal to the controller, and
when the voltage of the battery unit does not rise by the predetermined amount or more in the pre-charge and when the battery controller ends charging of the battery unit, outputs a charging stop signal to the controller, and
wherein the controller
switches the switching unit to the first state when the controller acquires the charging stop signal from the battery controller, and
switches the switching unit to the second state when the controller acquires the charging start signal from the battery controller.

5. The working machine according to claim 3, comprising:
a temperature detector that detects a temperature of the battery unit,
wherein the switching unit includes a flow-rate regulating valve capable of continuously regulating, between the first state and the second state, a ratio between the amount of water that flows through the electrical-component cooling water channel and the amount of water that flows from the electrical-component cooling water channel to the battery cooling water channel, in accordance with the temperature detected by the temperature detector.

6. The working machine according to claim 3, wherein the switching unit is provided in a region from the outflow port of the radiator to the electrical component in the electrical-component cooling water channel.

7. The working machine according to claim 3,
wherein the electrical-component cooling water channel is provided with a plurality of the electrical components connected to each other in series along a path thereof for the cooling water, and
wherein the switching unit is provided in a region between one of the electrical components and another one of the electrical components in the electrical-component cooling water channel.

8. The working machine according to claim 6, wherein one end of the battery cooling water channel is connected to the switching unit, and another end of the battery cooling water channel is connected to a region from the switching unit to the electrical component in the electrical-component cooling water channel.

9. The working machine according to claim 6, wherein one end of the battery cooling water channel is connected to the switching unit, and another end of the battery cooling water channel is connected to a region from the electrical component to the inflow port of the radiator in the electrical-component cooling water channel.

10. The working machine according to claim 6,
wherein the electrical-component cooling water channel is provided with a plurality of the electrical components connected to each other in series along a path thereof for the cooling water, and
wherein one end of the battery cooling water channel is connected to the switching unit, and another end of the battery cooling water channel is connected to a region between one of the electrical components and another one of the electrical components in the electrical-component cooling water channel.

11. The working machine according to claim 3,
wherein the switching unit is an electromagnetic switching valve that switches between the first state and the second state in accordance with the instruction of the controller.

12. The working machine according to claim 11,
wherein the controller
switches the switching unit to the first state when the battery unit is not under being charged, and
switches the switching unit to the second state when the battery unit is under being charged.

13. The working machine according to claim 11,
wherein the electrical component includes an electric motor that is driven by electric power, and
wherein the controller
switches the switching unit to the first state when a load on the electric motor is less than a predetermined value, and
switches the switching unit to the second state when the load on the electric motor is more than or equal to the predetermined value.

14. The working machine according to claim 11, comprising:
a temperature detector that detects a temperature of the battery unit,
wherein the controller
switches the switching unit to the first state when the temperature of the battery unit is less than a predetermined value, and
switches the switching unit to the second state when the temperature of the battery unit is more than or equal to the predetermined value.

* * * * *